United States Patent
Mizuno

(10) Patent No.: US 7,228,384 B2
(45) Date of Patent: Jun. 5, 2007

(54) CACHE STORAGE SYSTEM THAT ENABLES EXCLUSION OF LOCKING OF AN AREA TO BE ACCESSED

(75) Inventor: Makio Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 10/764,600

(22) Filed: Jan. 27, 2004

(65) Prior Publication Data
US 2004/0260768 A1 Dec. 23, 2004

(30) Foreign Application Priority Data

Apr. 22, 2003 (JP) ............... 2003-116451
Oct. 30, 2003 (JP) ............... 2003-369811

(51) Int. Cl.
G06F 13/00 (2006.01)
G06F 13/378 (2006.01)
H04L 12/28 (2006.01)

(52) U.S. Cl. ................. 711/118; 719/313; 370/389
(58) Field of Classification Search .............. None
See application file for complete search history.

(56) References Cited

U.S. PATENT DOCUMENTS

| | | | | |
|---|---|---|---|---|
| 5,353,416 A | * | 10/1994 | Olson ............ 710/108 |
| 5,454,108 A | * | 9/1995 | Devarakonda et al. ...... 718/104 |
| 5,590,300 A | * | 12/1996 | Lautzenheiser ............ 711/202 |
| 5,809,527 A | * | 9/1998 | Cooper et al. ............ 711/133 |
| 5,835,942 A | * | 11/1998 | Putzolu .................. 711/113 |
| 5,948,062 A | | 9/1999 | Tzelnic et al. |
| 5,987,477 A | * | 11/1999 | Schmuck et al. ........... 707/201 |
| 6,385,701 B1 | * | 5/2002 | Krein et al. .............. 711/141 |
| 6,487,638 B2 | * | 11/2002 | Dawkins et al. ........... 711/133 |
| 6,845,426 B2 | * | 1/2005 | Kuwata .................. 711/113 |
| 2003/0140207 A1 | | 7/2003 | Nagase et al. |
| 2003/0187860 A1 | * | 10/2003 | Holland .................. 707/100 |
| 2003/0204677 A1 | | 10/2003 | Bergsten |
| 2004/0148479 A1 | | 7/2004 | Patel et al. |

FOREIGN PATENT DOCUMENTS

| | | |
|---|---|---|
| JP | 11-024981 | 1/1999 |
| JP | 2001-290787 | 10/2001 |

* cited by examiner

*Primary Examiner*—Hyung S. Sough
*Assistant Examiner*—Duc T. Doan
(74) *Attorney, Agent, or Firm*—Mattingly, Stanger, Malur & Brundidge, P.C.

(57) ABSTRACT

A cache storage device is provided between a client and a storage device so that an area to be accessed by the client can be locked or excluded in advance.

4 Claims, 17 Drawing Sheets

FIG.4

| iSCSI Name | LOCK STATUS | |
|---|---|---|
| | 420 : CACHE | 425 : STORAGE DEVICE |
| Name 1 | OFF | OFF |
| Name 2 | OFF | OFF |

| Index | iSCSI Name | LOCK STATUS | |
|---|---|---|---|
| | | CACHE | STORAGE |
| dev 1 | Name 1 | OFF | OFF |
| dev 2 | Name 2 | OFF | OFF |

(2)

| Index | iSCSI Name | LOCK STATUS | |
|---|---|---|---|
| | | CACHE | STORAGE |
| dev 1 | Name 1 | ON | OFF |
| dev 2 | Name 2 | OFF | OFF |

(3)

| Index | iSCSI Name | LOCK STATUS | |
|---|---|---|---|
| | | CACHE | STORAGE |
| dev 1 | Name 1 | OFF | OFF |
| dev 2 | Name 2 | OFF | OFF |

(4)

| Index | iSCSI Name | LOCK STATUS | |
|---|---|---|---|
| | | CACHE | STORAGE |
| dev 1 | Name 1 | OFF | ON |
| dev 2 | Name 2 | OFF | OFF |

(5)

| Index | iSCSI Name | LOCK STATUS | |
|---|---|---|---|
| | | CACHE | STORAGE |
| dev 1 | Name 1 | OFF | OFF |
| dev 2 | Name 2 | OFF | OFF |

| Index | iSCSI Name | LOCK STATUS | |
|---|---|---|---|
| | | CACHE | STORAGE |
| dev 1 | Name 1 | OFF | OFF |
| dev 2 | Name 2 | OFF | OFF |

(2)

| Index | iSCSI Name | LOCK STATUS | |
|---|---|---|---|
| | | CACHE | STORAGE |
| dev 1 | Name 1 | OFF | ON |
| dev 2 | Name 2 | OFF | OFF |

(3)

| Index | iSCSI Name | LOCK STATUS | |
|---|---|---|---|
| | | CACHE | STORAGE |
| dev 1 | Name 1 | OFF | OFF |
| dev 2 | Name 2 | OFF | OFF |

FIG.11

| 1305 : DEVICE NAME | 1310 : ADDRESS |
|---|---|
| Dev 1 | Name 1 |
| Dev 2 | Name 2 |
| Dev 3 | Name 3 |

1300

CACHE STORAGE SYSTEM THAT ENABLES EXCLUSION OF LOCKING OF AN AREA TO BE ACCESSED

BACKGROUND OF THE INVENTION

The present invention relates to a technique for improving response performance in data transmission between a server and a storage device through a network and reducing overhead at the time of occurrence of a fault.

The mainstream of the connection form of a storage device (hereinafter also referred to as "storage") changes from Direct Attached Storage (DAS) of a computer (hereinafter referred to as "server") direct-coupling type to Storage Area Network (SAN) of a network coupling type. FC-SAN using a fibre channel is generally used as a transmission system for achieving SAN.

On the other hand, Ethernet (registered trademark) lagged behind the fibre channel in transmission performance is being improved with the advance of network technology so as to be applied to SAN. This is called IP-SAN to be-distinguished from FC-SAN. Although there are several candidates for means of achieving IP-SAN, iSCSI (Internet SCSI) is said to be a leading candidate.

In iSCSI based on Ethernet (registered trademark) low in reliability, TCP/IP protocol is used in order to ensure reliability on data transmission. There is however a problem that overhead for data transmission increases though the use of TCP/IP ensures reliability.

For example, TCP is of a connection type. A process of compensating the sequence of data transmitted through a TCP layer, a process of correcting error and a process of retransmitting data at the time of occurrence of a fault are carried out. Particularly, overhead due to the process of retransmitting data at the time of occurrence of a fault increases in proportion to the connection distance between the server and the storage and exerts influence on performance.

As means for solving the problem on the retransmission process in TCP, there has been proposed a method in which a device (hereinafter referred to as "cache device") for temporarily storing (hereinafter referred to as "caching") data is disposed between the server and the storage so that a request given from the server can be cached by the cache device. When a retransmission process occurs, data, etc. are retransmitted from the cache device, not from the server, so that the overhead can be reduced.

The idea of the aforementioned cache device is employed as "Web cache" in Web access technology. Specifically, in the Web, it is general that a page acquired from a server is temporarily cached by a local cache device.

If consideration is given to the fact that the page is updated in real time on the server side, it is necessary for this type Web cache to guarantee freshness of the page cached by the local cache device, i.e., coincidence of data in the page cached by the local cache device with data in the page managed by the server.

In a protocol HTTP (HyperText Transport Protocol) for achieving Web access, a method of locally judging, on the basis of information such as Age defined in a header of response packet to a request given to the Web server, whether data cached by the local cache device can be used or not, is used as means for guaranteeing the freshness. Incidentally, the data allowed to be cached locally are limited to data corresponding to read commands (for reading data from the server).

A data caching method used in a file system has been further disclosed in JP-A-11-24981 and JP-A-2001-290787.

In JP-A-11-24981, there has been disclosed a technique which is used in a system having a file server connected to a network, and clients connected to the network through a cache server (as a kind of cache device) and in which a file high in access frequency is prefetched on the cache server to achieve high-speed file access.

In JP-A-2001-290787, there has-been disclosed a technique which is used in a system having a server, cache servers and clients connected to one another through a network and in which data are distributed through only a cache server low in load on data distribution to a client as a data requester and little in delay of communication time to thereby prevent wasteful data from being accumulated on other cache servers.

SUMMARY OF THE INVENTION

The background art is intended for file data and configured so that only read data can be cached by a cache device. Incidentally, the concept "file data" means data formed as a unit that can be accessed by a file system.

In an application requiring good transaction performance, it is however preferable that data are accessed block by block. This is because access to file data is finally converted into block-by-block access so that overhead exerts influence on the transaction performance.

For example, in a database application, write access as well as read access has to be made.

Write access has a problem in the case where a plurality of clients make access to the cached data simultaneously. When the plurality of clients issue requests to make write access to a data storage area, data cannot be guaranteed because the requests compete with each other in the cache device to write or rewrite the data. Nothing is mentioned about this point in the background art.

In the background art, a data communication path between a sender's device and a receiver's device is decided according to algorithm settled by a communication protocol. Accordingly, even in the case where a cache device is provided on a network, the data communication path may be decided so that data do not pass through the cache device. There is a problem that the benefit of use of the cache device cannot be always enjoyed.

Generally, in the algorithm for deciding the data communication path, the data communication path is decided on the basis of the number of networks (Hop number) used for data transmission and the cost taken for data transmission without consideration of the presence of the cache device. Accordingly, in the background art, use of the cache device in data transmission cannot be always guaranteed.

An object of the invention is to improve efficiency in data transmission between a server and a storage device.

Another object of the invention is to prevent competition of requests in a cache device in the case where the requests are issued from a plurality of clients.

A further object of the invention is to make it possible for each client to communicate with a cache device on a network.

A further object of the invention is to ensure security in data transmission among a server, a storage device and a cache device.

To solve the problems, a cache device which can be connected to a network and which is used for temporarily storing data block by bock is provided between a client and a storage device. A management terminal such as a name server provided in the network is used for designating the cache device as a substitute for the storage device when the client tries to communicate with the storage device.

BRIEF DESCRIPTION OF THE DRAWINGS

FIG. 4 is a view showing an example of a lock management table;

FIG. 7 is a view showing an example of change in contents of the lock management table in the cache storage device;

FIG. 8 is a view showing an example of change in contents of the lock management table in the storage device;

FIG. 11 is a view showing an example of an address correspondence table;

DESCRIPTION OF THE EMBODIMENTS

Embodiments of a cache device according to the invention will be described below more in detail with reference to the drawings in the case where the cache device is provided as a storage device (hereinafter also referred to as "cache storage device" or "cache storage").

Figure 1:
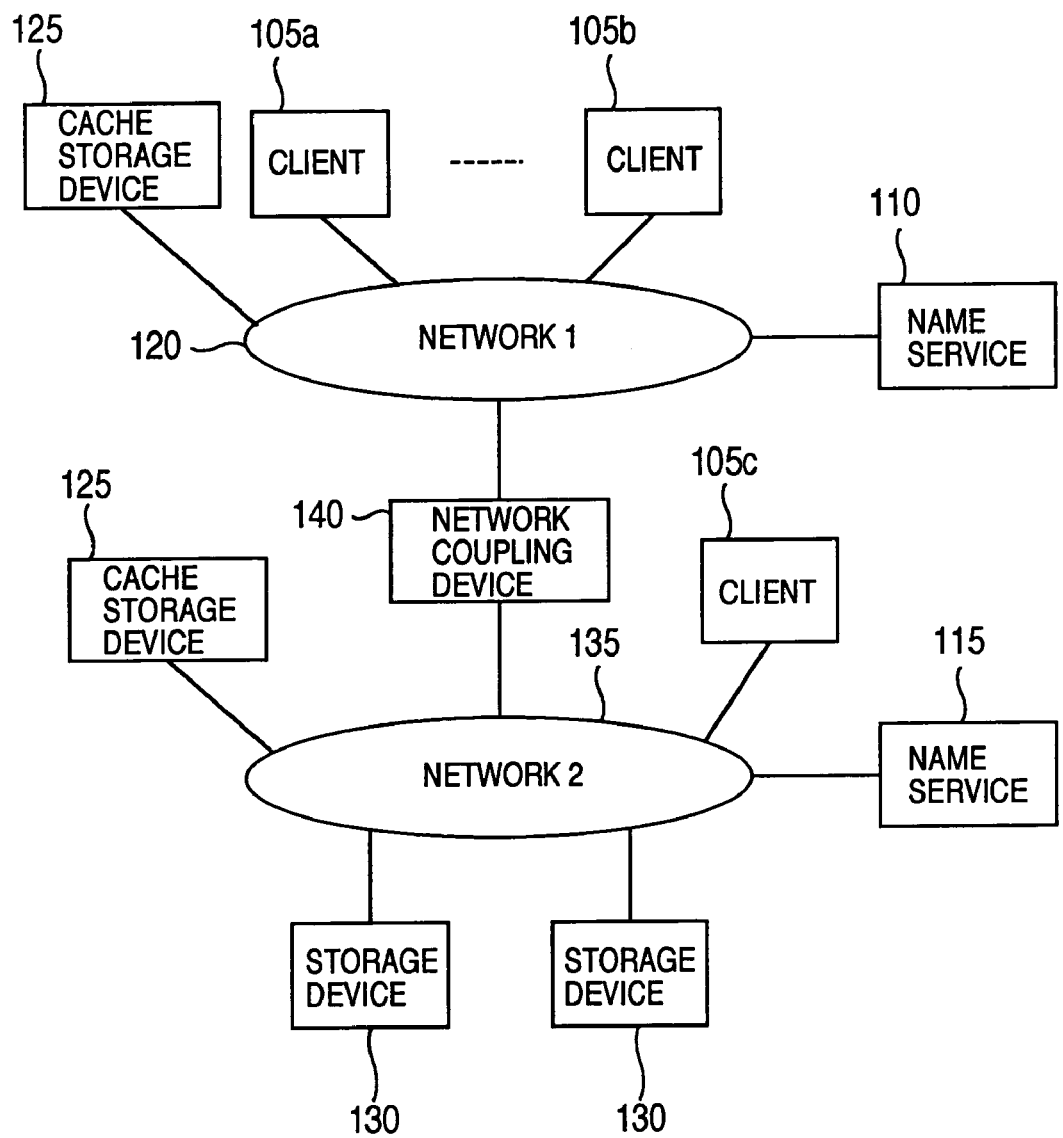
FIG. 1 is a diagram showing an example of overall configuration of a network system.

FIG. 1 shows an overall configuration of a network system including an embodiment of the cache storage device.

The network system according to this embodiment includes: a plurality of networks 120 and 135; clients 105, cache storage devices 125, name services 110 (110a and 110b) and storage devices 130 connected to the networks; and a network coupling device 140 for coupling the networks to each other.

Each client 105 is a computer for issuing a request to a storage target. Here, the term "storage target" means a storage device 130 with which the client 105 tries to communicate.

Each name service 110 is a computer for providing name service. Each name service 110 is equivalent to a DNS (Domain Name System) in a TCP/IP network, an iSNS (Internet Storage Name Service) server or an SLP DA (Service Location Protocol-Directory Agent) in an iSCSI, etc. In FIG. 1, the name service 110a is equivalent to a DNS server while the name service 110b is equivalent to an iSNS server.

The name services 110 are provided on independent networks respectively. In FIG. 1, two networks are provided and one name service is provided on each network.

Although each name service is generally formed as a redundant structure in order to improve fault tolerance, the redundant structure is not shown in FIG. 1.

Each cache storage device 125 is used for temporarily storing data transmitted from a client 105 when the client 105 tries to communicate with a storage device 130.

Each storage device 130 is a subsystem such as a disk array subsystem having storage devices such as disk drives.

The client 105c, the cache storage device 125b, the storage devices 130 and the name service 110b are connected to the network 135.

The clients 105a and 105b and the name service 110a are connected to the network 120. For example, an LAN (Local Area Network) or the like is used as the network 120.

Assume now that the networks 120 and 135 are independent and separate so that the networks 120 and 135 can be distinguished as networks 1 and 2 respectively.

The network coupling device 140 is a device for coupling the different networks to each other.

Name service will be described below in brief.

DNS is a system for acquiring an IP address corresponding to each client from an identifier (hereinafter referred to "host name") given to the client connected to a network. A DNS server manages the correspondence by using a database.

For example, assume now that the host name and IP address of the client 105a are abc and 192.168.0.1 respectively and the host name and IP address of the client 105b are def and 192.168.0.10 respectively.

When the client 105a tries to communicate with the client 105b, the client 105a inquires of the name service 110a the IP address of the client 105b by using the host name of the client 105b.

Upon reception of the inquiry, the name service 110a sends the IP address corresponding to the host name of the client 105b back to the client 105a by retrieving the IP address from the database managed by the name service 110a.

The client 105a can only communicate with the client 105b when the client 105a has received the IP address from the name service 110a.

On the other hand, iSNS is a framework for managing the storage device 130 for iSCSI use (hereinafter referred to as "iSCSI storage") and the storage device 130 for fibre channel use (hereinafter referred to as "fibre channel storage") on the IP network. The iSNS server manages clients and storage devices on the network.

In the case of the iSCSI storage, iSCSI name is used for identifying the clients and storage devices. In the case of the fibre channel storage, WWPN (World Wide Port Name) is used for identifying the clients and storage devices.

The procedure of iSNS name service will be described below in brief with reference to FIG. 1. Assume now that the client 105c tries to communicate with the storage device 130 through the name service 110b in FIG. 1.

Description will start in the condition that the storage device 130 has been already connected to the network 2 and that information of the storage device 130*a* has been already registered in the name service 110*b*.

When the client 105*c* is connected to the network 2, the client 105*c* first registers its own information in the name service 110*b*. As a result, the name service 110*b* sends a notice of the presence of the client 105*c* on the network 2 to the storage device 130*a* present on the network 2.

The client 105*c* sends a request (hereinafter referred to "query") to the name service 110*b* to detect the storage device 130*a* and acquires information (such as iSCSI name, IP address and port number) of the storage device 130*a* as a reply to the query.

After the aforementioned procedure, the client 105*c* is enabled to communicate with the iSCSI storage device 130.

Figure 2:
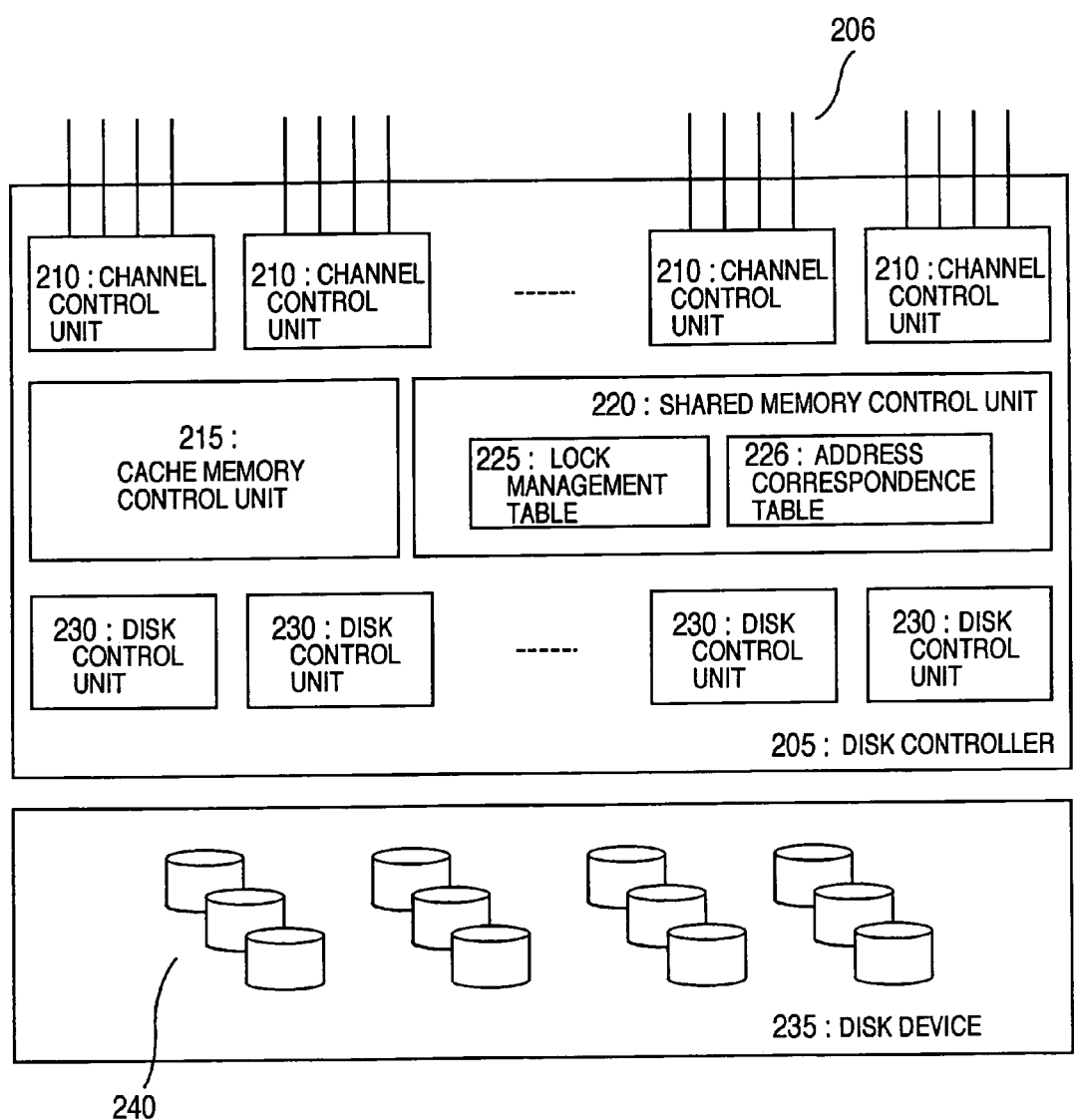
FIG. 2 is a diagram showing an example of configuration of each of a storage device and a cache storage device.

FIG. 2 is a diagram showing an example of configuration of each of a cache storage device 125 and a storage device 130.

The cache storage device 125 includes a disk controller 205, and a disk device 235.

The disk controller 205 has an I/O path 206, channel control units 210, a cache memory control unit 215, a shared memory control unit 220, and disk control units 230.

The I/O path 206 is a communication line for connecting the channel control units 210 to the network 2.

Each channel control unit 210 has a network interface. Each channel control unit 210 controls transmission/reception of user data to/from a client and access to shared data such as control information stored in the inside of the disk controller 205. A plurality of channel control units 210 are provided in the disk controller 205.

The cache memory control unit 215 has a cache memory for temporarily storing user data stored in the client and the disk device 235. The cache memory control unit 215 controls the channel control units 210 or the disk control units 230 to make access to the cache memory.

The shared memory control unit 220 has a shared memory for storing control information concerning communication in the inside of the disk controller 205. The shared memory control unit 220 controls the channel control units 210 or the disk control units 230 to make access to the shared memory.

The shared memory control unit 220 further has a lock management table 225 for indicating the lock status of each device in the cache storage device 125, and an address correspondence table 226.

Here, the term "device" means a logical or physical recording medium in the storage device 130 or the cache storage device 125. For example, the device may be a disk drive or may be a logical unit constituted by disk drives. The following description will be made on the assumption that a disk drive is used as each device.

The term "lock" means a state in which a certain device is monopolized by a certain device so as to be disabled from being used by any other device. The term "locking" means disabling a certain device from being used by any other device.

Information for indicating locked devices is registered in the lock management table 225.

Information for indicating correspondence of devices in the cache storage device 125 with devices in the storage device 130 is stored in the address correspondence table 226.

Specifically, addresses of devices designated when data present in the cache memory for temporarily storing user data from a client 105 or in the disk device 235 are stored in the storage device 130 are managed by the address correspondence table 226 so that addresses of devices in the storage device 130 can correspond to addresses of devices in the cache storage device 125.

Each disk control unit 230 controls communication with the disk device 235 and access to the cache/shared memory. The number of channel control units 210 and the number of disk control units 230 are not limited.

The channel control units 210 are bus- or star-connected to the cache memory control unit 215 and the shared memory control unit 220. The disk control units 230 are also bus- or star-connected to the cache memory control unit 215 and the shared memory control unit 220.

The disk device 235 has a plurality of disk drives 240 for storing data used by the user (hereinafter also referred to as user data), etc.

Each cache storage device 125 allocates at least one iSCSI name to the disk drives 240 of the disk device 235. Incidentally, the cache storage device 125 may allocate iSCSI names to other devices. The term "iSCSI name" means information for identifying each device recognizing an iSCSI protocol.

Figure 3:
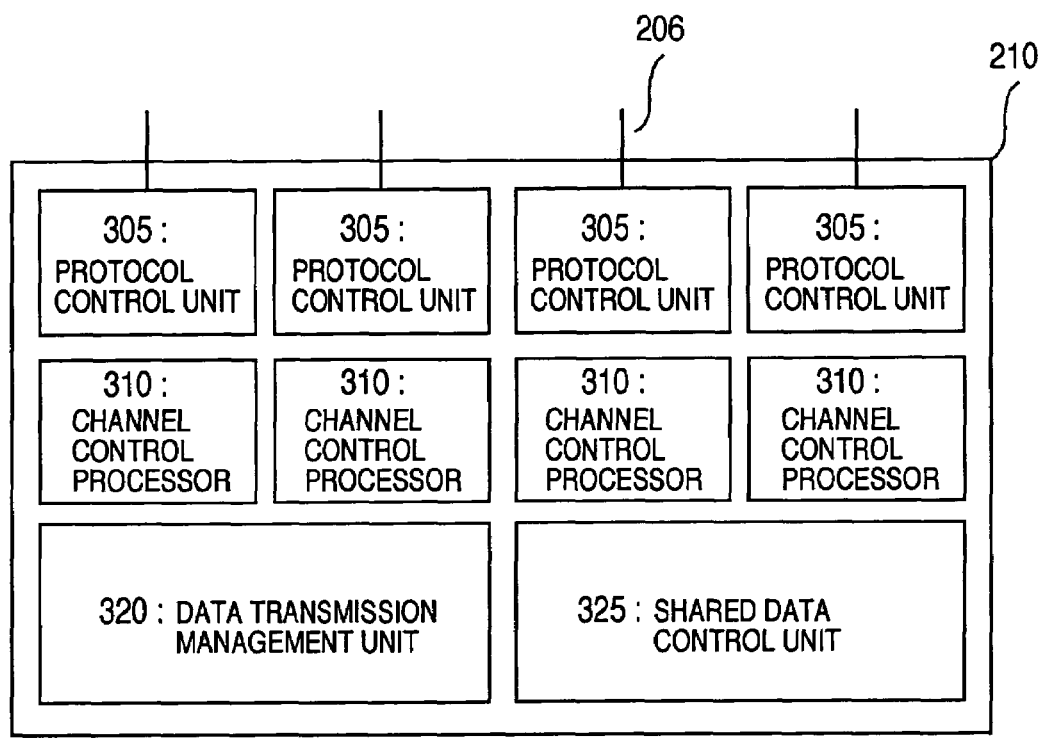
FIG. 3 is a diagram showing an example of configuration of a channel control unit.

FIG. 3 is a diagram showing an example of configuration of each channel control unit 210. The channel control unit 210 includes protocol control units 305, channel control processors 310, a data transmission management unit 320, and a shared data control unit 325.

Each protocol control unit 305 receives a network packet through an I/O path 206. When the received network packet contains an iSCSI packet, the protocol control unit 305 extracts an iSCSI header, SCSI commands, data, etc. from the iSCSI packet and passes them to a channel control processor 310. An appropriate process is applied to another packet than the iSCSI packet. When, for example, the packet is provided for an ICMP (Internet Control Message Protocol) request, an ICMP reply is issued.

The protocol control unit 305 receives a result of SCSI command processing from the channel control processor 310 and generates an iSCSI packet. The protocol control unit 305 encapsulates the iSCSI packet in a network packet and sends the encapsulated packet to the network 2 through the I/O path 206.

Each channel control processor 310 is a processor for receiving SCSI commands, data, etc. from the protocol control unit 305, analyzing them and instructing the inside of the disk controller in accordance with the contents of the analyzed request.

The data transmission management unit 320 transmits user data of the client and reads user data from the disk device on the basis of the instruction given from the channel control processor 305.

The shared data control unit 325 controls access to the shared memory in which shared data such as control information are stored.

Figure 13:
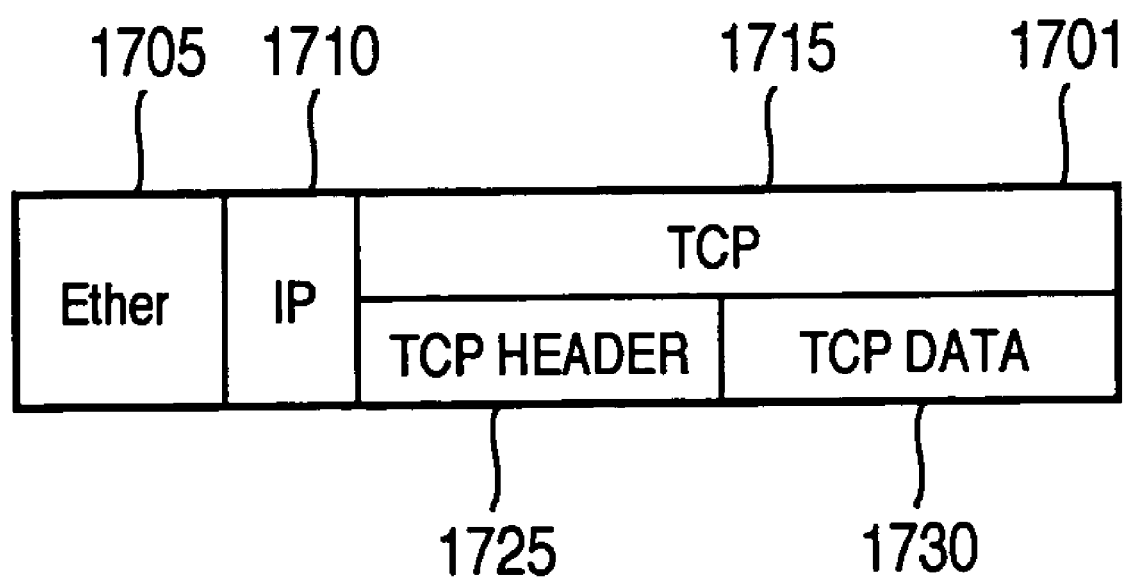
FIG. 13 is a view showing an example of a network packet.

FIG. 13 is a view showing an example of the relation between a network packet and an iSCSI packet. The network packet 1701 is composed of an Ethernet header 1705, an IP header 1710, and a TCP datagram 1715. The Ethernet header 1705 contains control information (such as an MAC address) and data concerning a data link layer. The IP header 1710 contains control information (such as an IP address) and data concerning an IP layer. The TCP datagram 1715 is composed of a TCP header 1725, and TCP data 1730. The TCP header 1725 contains control information (such as a port number, a sequence number, etc.) concerning a TCP layer. The TCP data 1730 contain an iSCSI packet. The iSCSI packet contains control information necessary for iSCSI, and SCSI commands and data.

FIG. 4 is a view showing an example of configuration of the lock management table 225.

The lock management table 225 has entries each having a plurality of fields 405 and 410. The entries correspond to iSCSI names.

The field 405 is a field used for registering iSCSI names. The iSCSI names registered in the field 405 are iSCSI names used for identifying devices in the cache storage device.

The field 410 is a field used for registering lock status. The term "lock status" means information for indicating the lock status of each of devices in the cache storage device 125 and devices in the storage device 130 corresponding to the iSCSI names registered in the field 405.

The field 410 further has sub-fields 420 and 425. The sub-field 420 is used for registering cache lock flags. The term "cache lock flag" means information for judging whether a device in the cache storage device corresponding to an iSCSI name 405 is locked or not. When, for example, the cache lock flag is "OFF", the cache lock flag indicates that the device is not locked. When, for example, the cache lock flag is "ON", the cache lock flag indicates that the device is locked.

The sub-field 425 is used for registering storage device lock flags. The term "storage device lock flag" means information for judging whether a device in the storage device 130 corresponding to a device in the cache storage device 125 identified by an iSCSI name is locked or not. When, for example, the storage device lock flag is "OFF", the storage device lock flag indicates that the device is not locked. When, for example, the storage device lock flag is "ON", the storage device lock flag indicates that the device is locked.

When this table is used in the aforementioned manner, the lock status of each of the cache storage device and the storage device can be grasped so that data can be guaranteed even in the case where accesses compete with each other.

FIG. 11 is a view showing an example of the address correspondence table 226. The address correspondence table 226 has entries each having a plurality of fields 1305 and 1310. The entries correspond to devices in the cache storage device.

The field 1305 is a field used for storing device names. The device names correspond to iSCSI names allocated to devices in the cache storage device 125.

The field 1310 is a field used for registering storage device addresses. The storage device addresses are equivalent to iSCSI names given to devices in the storage device 130 in accordance with the device names registered in the field 1305.

When data in a device in the cache storage device 125 are to be stored in the storage device 130, a corresponding device in the storage device 130 is first logged in.

When the iSCSI name of the device to be logged in is designated, a storage device address is used as a log-in parameter with reference to the address correspondence table. When this table is used in the aforementioned manner, information necessary for the storage device 130 to be logged in can be referred to easily.

Figure 5:
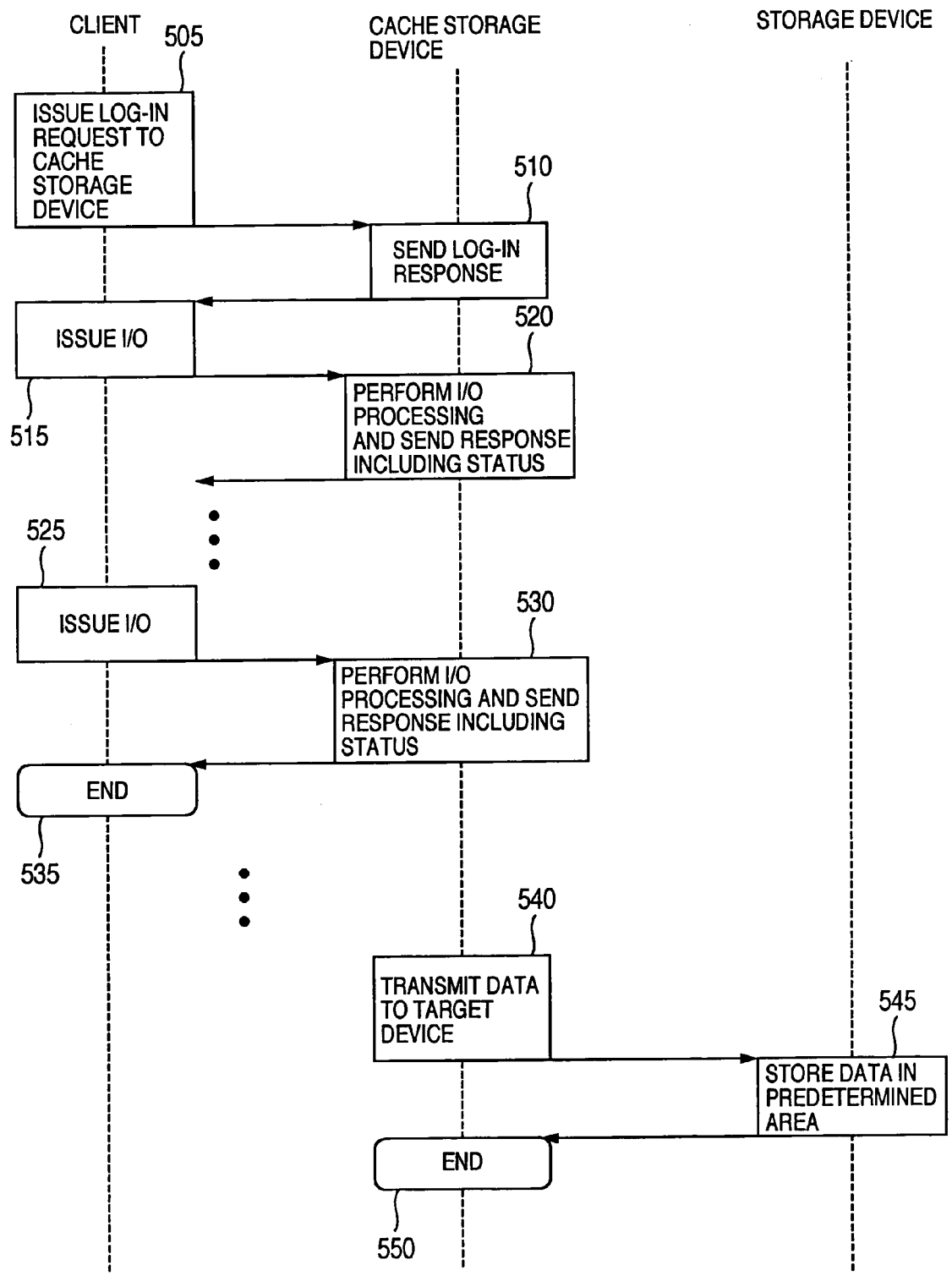
FIG. 5 is a chart showing an example of communication flow from a client to a storage device.

FIG. 5 is a flow chart showing a procedure of communication between each client 105 and a cache storage device 125 and a procedure of communication between the cache storage device 125 and a storage device 130 in the case where devices in the storage device 130 are allocated to clients 105 respectively in this embodiment. Assume now that communication performed here is a write process.

In FIG. 5, there is no competition between requests in the cache storage device 125 because devices are allocated to the clients 105 respectively in advance. Accordingly, it is unnecessary to lock any device.

First, a client 105 issues a log-in request to an allocated device in the cache storage device 125. On this occasion, the log-in request that should arrive at the storage device 130 originally needs to be led to the cache storage device 125.

Therefore, in this embodiment, the name service 110 sends information of the cache storage device 125, not information of the storage device 130 when the client 105 first acquires information of the log-in device. For example, the information of the cache storage device 125 is any one of an IP address, a port number and an iSCSI name or a combination of these.

The information of the cache storage device 125 is decided after the cache storage device 125 and the name service 110 communicate with each other. For example, a method of communication using TCP data or a method of communication using messages decided according to Vender Specific Message of iSNS is used as the method of communication. In this manner, the name service 110 provides information of the cache storage device 125, not information of the storage device 130 to the client 105 when the client 105 issues a request to acquire information (step 505).

Upon reception of the log-in request, the cache storage device 125 sends a log-in enabled status and a log-in response message to the client 105. At this point of time, a session is held between the client 105 and the device in the cache storage device 125 (step 510).

Then, the client 105 issues a request, e.g., a write request in this embodiment, to the cache storage device 125 (step 515).

The cache storage device 125 processes the request (e.g., writes data) and sends a message containing a status to the client 105. The status is information for indicating whether processing of the request is terminated normally and for indicating the cause of abnormal termination when processing of the request is terminated abnormally (step 520).

The client 105 and the cache storage device 125 repeat the steps 515 and 520 if necessary. When the client 105 then issues a last request (step 525) and receives a message as a response to the request from the cache storage device 125 (step 530), the client 105 side process is terminated (step 535).

After communication of the cache storage device 125 with the client 105 is terminated, the cache storage device 125 goes to a process of storing data in the storage device 130. Incidentally, the process of storing data in the storage device 130 may be carried out just after completion of communication with the client 105 or at appropriate timing.

In the data storing process, the cache storage device 125 first logs into the storage device 130 as a data storage destination and issues a write request to instruct data to be stored (step 540).

The storage device 130 stores user data transmitted from the cache storage device 125 into a predetermined area in accordance with the request (step 545).

Then, the storage device 130 sends a response to the request to the cache storage device 125 and terminates the process (step 550).

Incidentally, in the case where requested user data are present in the cache storage device 125 when the cache storage device 125 receives a read request from the client 105, the cache storage device 125 sends the user data to the client 105. If there is no user data, the cache storage device 125 reads user data from the storage device 130 and sends the user data to the client 105.

When user data are read from the storage device 130, the cache storage device 125 may send the user data to the client 105 while the user data are cached on the cache storage device 125 so that the cached user data can be used when the same request is received at the next round.

Because the aforementioned process can substitute communication with a place nearer to the client 105 for the conventional communication with the storage device 130, the response time viewed from the client 105 can be shortened to bring improvement in response performance and transaction performance.

Figure 12:
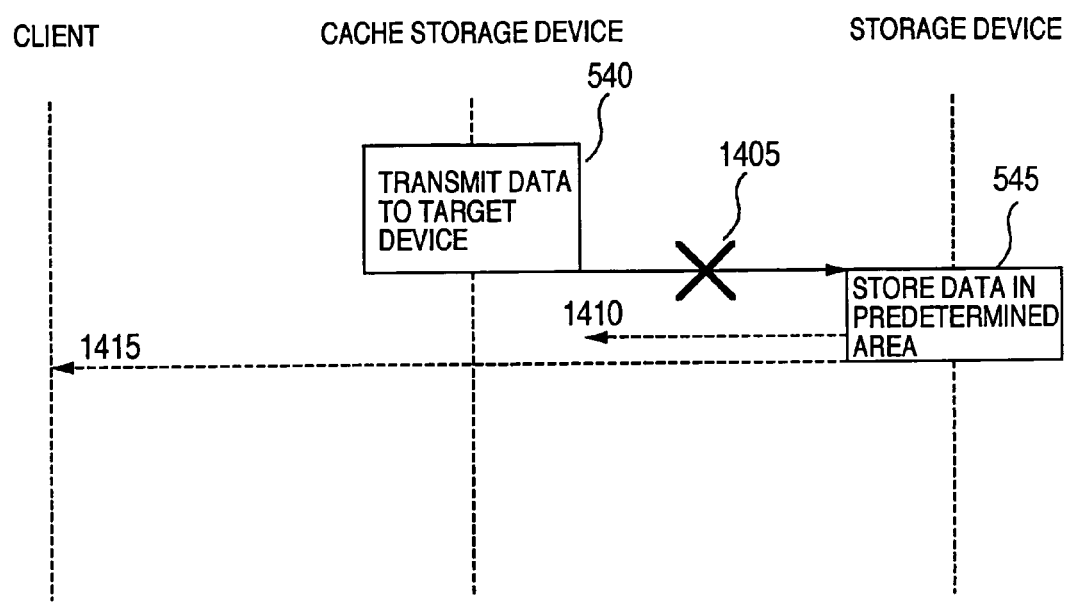
FIG. 12 is a chart showing an example of processing in the case where a fault occurs in a transmission path.

FIG. 12 is a chart showing a procedure of transmission in the case where a fault occurs in a transmission path in this embodiment.

Although FIG. 12 shows a procedure after the step 540 in FIG. 5, processing can be made in the same procedure even in the case where a fault occurs in a transmission path in another step in FIG. 5.

In step 540, the cache storage device 125 issues a request to the storage device 130 to carry out a process of storing user data stored in the cache storage device 125 into the storage device 130. Assume now that a fault occurs in a transmission path on this occasion (step 1405).

On this occasion, the cache storage device 125 is enabled to receive a response to the request. On the other hand, the storage device 130 cannot process the request because a fault occurs before the sent request reaches the storage device 130. Accordingly, the storage device 130 cannot reply to the request.

The cache storage device 125 detects time-out because of reception of no response and starts a retransmission process.

Because the aforementioned operation can substitute a process (1410) of retransmission to the cache storage device 125 located in a place nearer to the storage device 130 for the conventional process (1415) of retransmission to the client 105, load of the retransmission process can be lightened.

By the aforementioned process, transaction performance of the client 105 can be improved. Particularly when a network low in reliability is used, a larger effect can be obtained.

According to this embodiment, when the distance between a client and a storage device making block-by-block data communication with the client is large, a cache storage device is disposed between the client and the storage device. As a result, data from the client can be cached block by block so that response performance can be improved. Moreover, the retransmission process can be lightened so that transaction performance can be improved.

This embodiment in the case where lock control is made will be described below more in detail with reference to FIGS. 6 to 9. Incidentally, points not mentioned specially in the following description are the same as those in the case where lock control is not made.

Figure 6:
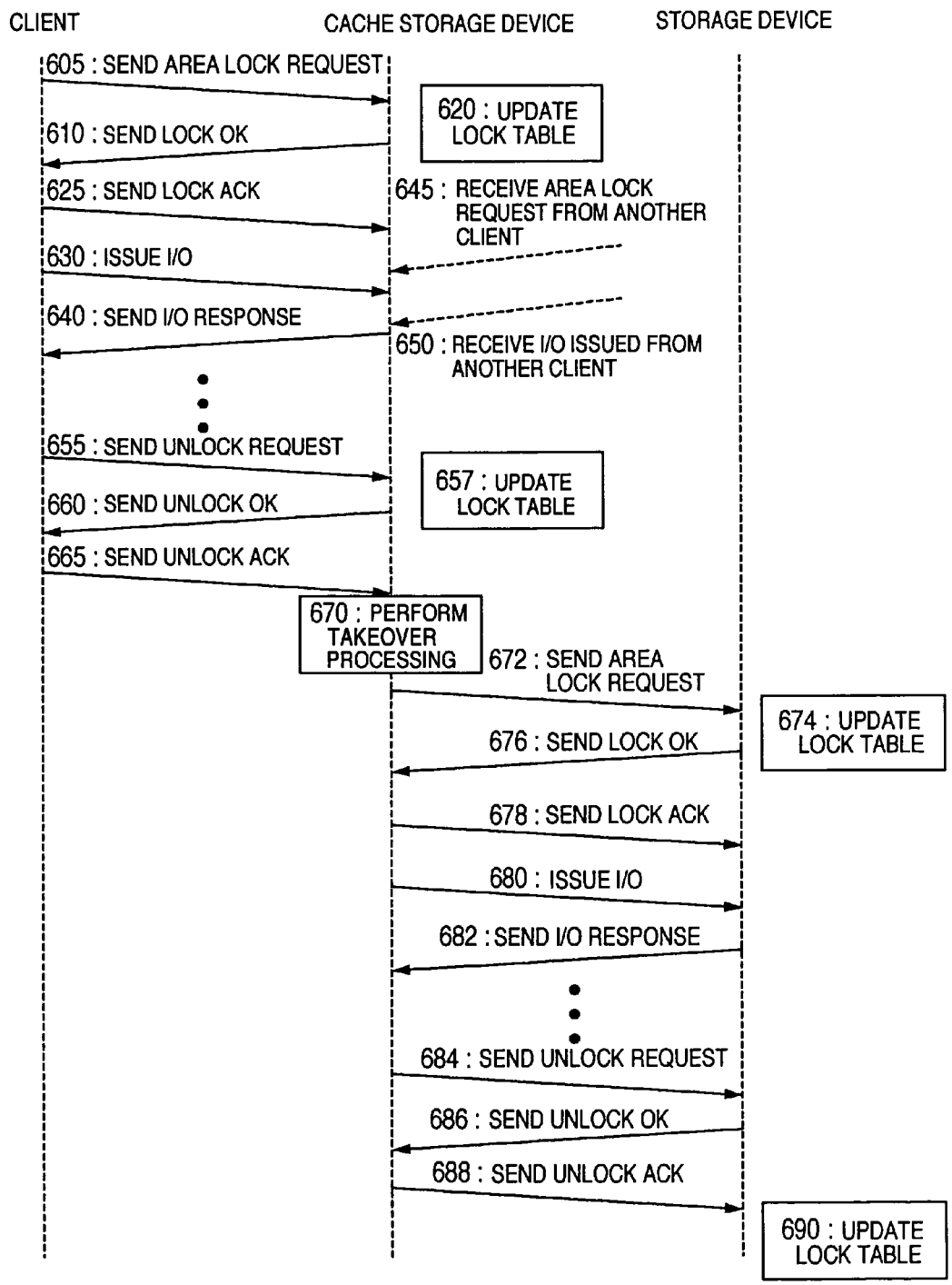
FIG. 6 is a chart showing an example of communication flow from a client to a storage device.

FIG. 6 is a chart showing a procedure of communication among the clients 105, the cache storage device 125 and the storage device 130 under lock control. In the following description, communication for a write process is taken as an example.

Here is shown the case where the clients 105 make lock control for devices of the cache storage device 125. That is, here is shown the case where requests from the clients 105 compete with each other on the cache storage device 125.

In this example, lock control is achieved by SCSI commands "Reserve" and "Release".

"Reserve" is a command for designating and reserving the whole of an area for a specific device so that the area can be exclusively occupied by the specific device.

"Release" is a command for releasing the whole of the area exclusively occupied by the specific device on the basis of the "Reserve" command.

Incidentally, the description of a log-in process will be omitted on the assumption that the log-in process has been already completed.

FIGS. 7 and 8 show transitions of contents of the respective lock management tables of the cache storage device 125 and the storage device 130. Incidentally, the contents of the lock management tables at the point of time when the log-in process is completed are as shown in Table (1) of FIG. 7 and Table (1) of FIG. 8 respectively.

Before a client 105 issues a request to the cache storage device 125, the client 105 issues a lock request to the cache storage device 125 to lock the device. The "Reserve" command is used in the lock request (step 605).

Upon reception of the "Reserve" command, the cache storage device 125 checks the lock status of an area (all or part of the device) designated on the cache storage device 125 by the "Reserve" command.

When the designated area has been not locked yet, the cache storage device 125 locks the area and sends status "Good" to the client 105.

When the designated area has been already locked, the cache storage device 125 sends status "Reservation conflict" to the client 105.

On this occasion, the cache storage device 125 issues a command "lock OK" to the client 105 in order to check the status of the client 105 which is a sender of the lock request (step 610).

Upon reception of the command "lock OK", the client 105 sends a command "lock Acknowledge" to the cache storage device 125 as a reply to the command "lock OK". The command "lock Acknowledge" is sent so that deadlock can be avoided when a lock request is received from another client 105 (step 625).

Then, the cache storage device 125 updates the contents of the lock management table (e.g., from Table (1) to Table (2) in FIG. 7) in accordance with the designated area (step 620).

After the client 105 sends the command "lock Acknowledge", the client 105 issues an I/O request to the cache storage device 125 (step 630).

The cache storage device 125 processes the I/O request and sends a response containing a status to the client 105 (step 640).

Even if a lock request for the same area is received from another client 105 (step 645) or even if an I/O request for the same area is received from another client 105 (step 650), the cache storage device 125 sends status "Reservation conflict" to the client 105 as a sender of the lock request or the I/O request to reject these requests.

The steps 630 and 640 are repeated if necessary. When this series of steps is completed, the client 105 issues an unlock request to the cache storage device 125. On this occasion, the "Release" command is used in the unlock request (step 655).

The cache storage device 125 unlocks the area designated by the "Release" command and sends status "Good" to the client 105. On this occasion, the cache storage device 125 issues a command "unlock OK" to the client 105 in the same manner as at "Reserve" time in order to check the status of the client 105 which is a sender of the unlock request (step 660).

Upon reception of the command "unlock OK", the client 105 sends a command "unlock Acknowledge" to the cache storage device 125 as a reply to the command "unlock OK" (step 665).

Upon reception of the command "unlock Acknowledge", the cache storage device 125 updates the contents of the lock management table (e.g., from Table (2) to Table (3) in FIG. 7) in accordance with the area designated by the "Release" command (step 657).

Then, the cache storage device 125 takeover processing to a channel control processor 310 controlling an I/O path connected to the storage device 130 in order to send the updated data to the storage device 130. A channel control processor 310 that communicates with the client 105 may keep on processing as it is. In this case, this process can be omitted (step 670).

Communication between the cache storage device 125 and the storage device 130 starts as follows. First, the cache storage device 125 issues a lock request to the storage device 130 to lock an area used by the cache storage device 125. On this occasion, the cache storage device 125 uses the "Reserve" command for deciding the designated area by referring to the address correspondence table 226 included in the cache storage device 125 (step 672).

Upon reception of the "Reserve" command, the storage device 130 checks the lock status of the area designated on the storage device 130 by the "Reserve" command.

When the designated area has been not locked yet, the storage device 130 locks the area and sends status "Good" to the cache storage device 125.

When the designated area has been already locked, the storage device 130 sends status "Reservation conflict" to the cache storage device 125.

On this occasion, the storage device 130 issues a command "lock OK" to the cache storage device 125 in order to check the status of the cache storage device 125 which is a sender of the lock request (step 676).

Upon reception of the command "lock OK", the cache storage device 125 sends a command "lock Acknowledge" to the storage device 130 as a reply to the command "lock OK". This is used as means for avoiding deadlock when a lock request is received from another cache storage device or client (step 678).

After the cache storage device 125 sends the command "lock Acknowledge", the cache storage device 125 updates the contents of the lock management table (e.g., from Table (3) to Table (4) in FIG. 7) in accordance with the designated area. Upon reception of the command "lock Acknowledge", the storage device 130 updates the contents of the lock management table (e.g., from Table (1) to Table (2) in FIG. 8) in accordance with the designated area (step 674).

After the lock management table 225 is updated, the cache storage device 125 issues an I/O request concerning updating of data to the storage device 130 (step 680).

Upon reception of the I/O request, the storage device 130 processes the I/O request and sends a response containing a status to the cache storage device 125 (step 682).

Then, the steps 680 and 682 are repeated if necessary. When this series of steps is completed, the cache storage device 125 issues an unlock request to the storage device 130 to unlock the area. On this occasion, the "Release" command is used in the unlock request (step 684).

Upon reception of the "Release" command, the storage device 130 unlocks the area designated by the "Release" command and sends status "Good" to the cache storage device 125.

On this occasion, the storage device 130 issues a command "unlock OK" to the cache storage device 125 in the same manner as at the "Reserve" time in order to check the status of the cache storage device 125 which is a sender of the unlock request (step 686).

Upon reception of the command "unlock OK", the cache storage device 125 sends a command "unlock Acknowledge" to the storage device 130 as a reply to the command "unlock OK" (step 688).

After the cache storage device 125 sends the command "unlock OK", the cache storage device 125 updates the contents of the lock management table 225 (e.g., from Table (4) to Table (5) in FIG. 7) in accordance with the designated area. Upon reception of the command "unlock OK", the storage device 130 updates the contents of the lock management table 225 (e.g., from Table (2) to Table (3) in FIG. 8) in accordance with the designated area (step 690).

By the aforementioned procedure, user data can be updated without any conflict even if there is competition for access among a plurality of clients 105.

Incidentally, in the aforementioned lock control, communication between the cache storage device 125 and the storage device 130 may be encrypted. A key is given to each of the cache storage device 125 and the storage device 130. This key is a key used for encrypting communication between the cache storage device 125 and the storage device 130.

The type of the key is not particularly limited. For example, a shared secret key type, a public key type, etc. may be used. Encrypted communication is made in the steps 672 to 688 in FIG. 6. Incidentally, encrypted communication may be also used as communication between the client 105 and the cache storage device 125 and between the cache storage device 125 and the storage device 130 regardless of the lock control.

In the aforementioned procedure, the lock process is made between the cache storage device 125 and the storage device 130 independently after the lock process is made between the client 105 and the cache storage device 125. As another lock control method, there may be however used a method in which the client 105 locks the storage device 130 directly.

Figure 9:
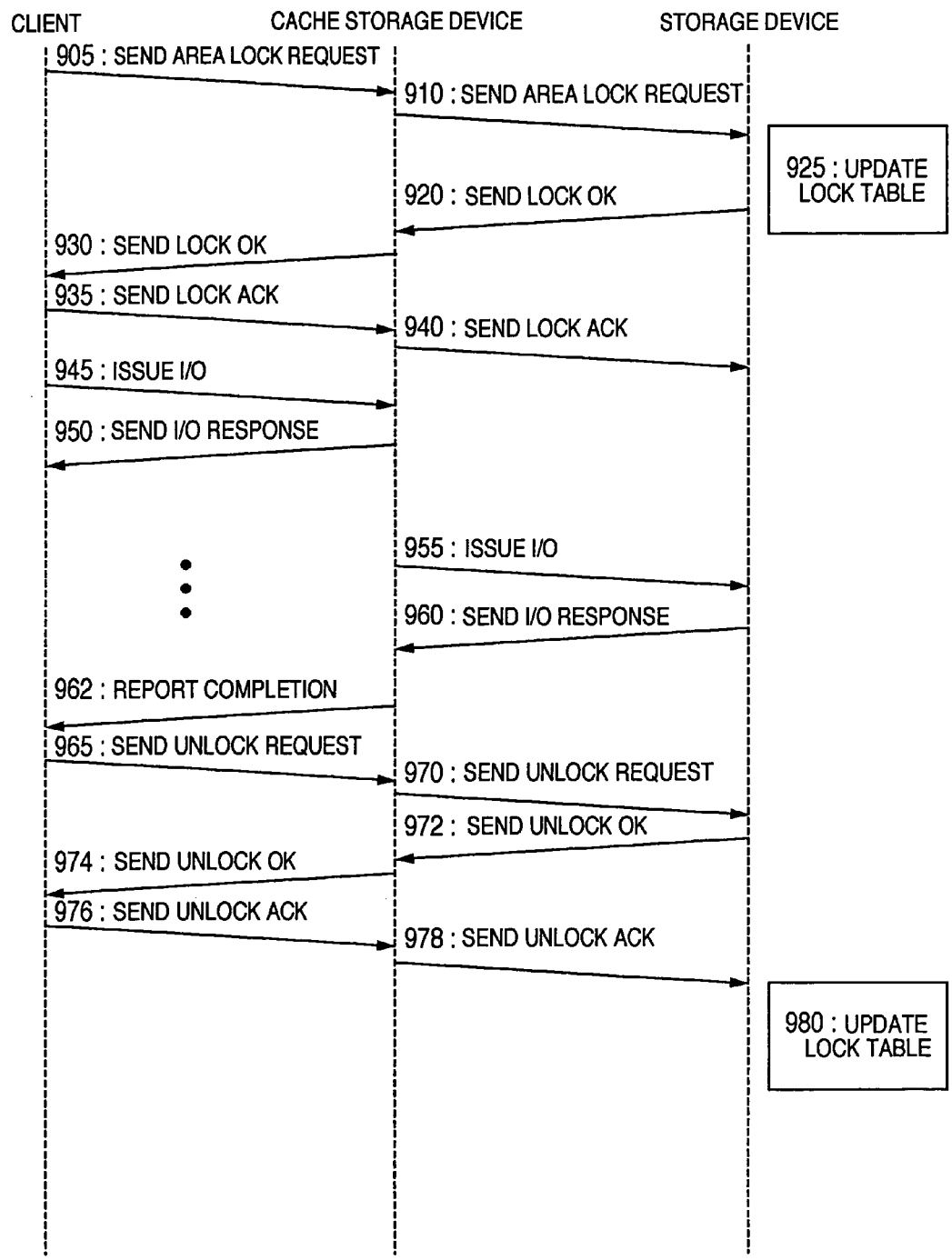
FIG. 9 is a chart showing an example of communication flow from a client to a storage device.

FIG. 9 is a chart showing an example of procedure in the case where the client 105 locks the storage device 130 directly.

The client 105 locks an area of the storage device 130 as follows. First, the client 105 issues a lock request to the cache storage device 125 (step 905).

Upon reception of the lock request, the cache storage device 125 issues a lock request to the storage device 130. On this occasion, the cache storage device 125 uses the "Reserve" command for deciding information of the area by referring to the address correspondence table (step 910).

Upon reception of the "Reserve" command, the storage device 130 checks the lock status of the area designated on the storage device by the "Reserve" command.

When the area has not been locked yet, the storage device 130 locks the area and sends status "Good" to the client 105 via the cache storage device 125.

When the area designated by the "Reserve" command has been already locked, the storage device 130 sends status "Reservation conflict" to the client 105 via the cache storage device 125. On the occasion, the storage device 130 issues a command "lock OK" to the client 105 via the cache storage device 125 in order to check the status of the client 105 which is a sender of the lock request (steps 920 and 930).

Upon reception of the command "lock OK", the client 105 sends a command "lock Acknowledge" to the storage device 130 via the cache storage device 125 as a reply to the command "lock OK" (steps 935 and 940).

Upon reception of the command "lock Acknowledge", the storage device 130 updates the contents of the lock management table (e.g., from Table (1) to Table (2) in FIG. 8) in accordance with the area (step 925).

After the client 105 sends the command "lock Acknowledge", the client 105 issues an I/O request to the cache storage device 125 (step 945).

Upon reception of the I/O request, the cache storage device 125 processes the I/O request and sends a response containing a status to the client 105 (step 950).

The steps 945 and 950 are repeated if necessary. When this series of steps is completed, the cache storage device 125 starts a process of sending data corresponding to the I/O request to the storage device 130. The timing of starting the process is optional. For example, the process may be started just after completion of the series of steps in the client 105.

The cache storage device 125 issues an I/O request for sending data received from the client 105 to the storage device 130 (step 955).

Upon reception of the I/O request, the storage device 130 makes processing corresponding to the I/O request and sends status to the cache storage device 125 (step 960).

The steps 955 and 960 are repeated if necessary. When this series of steps is completed, the cache storage device 125 reports the completion to the client 105. The report uses Asynchronous Message of iSCSI, or the like (step 962).

Upon reception of the report of the completion, the client 105 sends an unlock request to the storage device 130 via the cache storage device 125 (steps 965 and 970).

Upon reception of the unlock request, the storage device 130 unlocks the area designated by the unlock request and sends status to the client 105 via the cache storage device 125 (steps 972 and 974).

On this occasion, the storage device 130 issues a command "unlock OK" to the client 105 via the cache storage device 125 in the same manner as at the "Reserve" time in order to check the status of the client 105 which is a sender of the unlock request (steps 972 and 974).

Upon reception of the command "unlock OK", the client 105 sends a command "unlock Acknowledge" to the storage device 130 via the cache storage device 125 as a reply to the command "unlock OK" (steps 976 and 978).

Upon reception of the command "unlock Acknowledge", the cache storage device 125 updates the contents of the lock management table 225 (e.g., from Table (4) to Table (5) in FIG. 7) in accordance with the area. Upon reception of the command "unlock Acknowledge", the storage device 130 updates the contents of the lock management table 225 (e.g., from Table (2) to Table (3) in FIG. 8) in accordance with the area (step 980).

By the aforementioned lock control, the cache storage device 125 or each of the cache storage device 125 and the storage device 130 locks a designated area to reject access from another client so that the updating sequence of data can be guaranteed even if requests are received from a plurality of clients 105.

Incidentally, the same procedure as described above can be applied to the case where the cache storage device 125 is present on the network 1. Further, the aforementioned encrypted communication may be made in the steps 950 to 962 in FIG. 9.

Another lock control will be described below.

Figure 10:
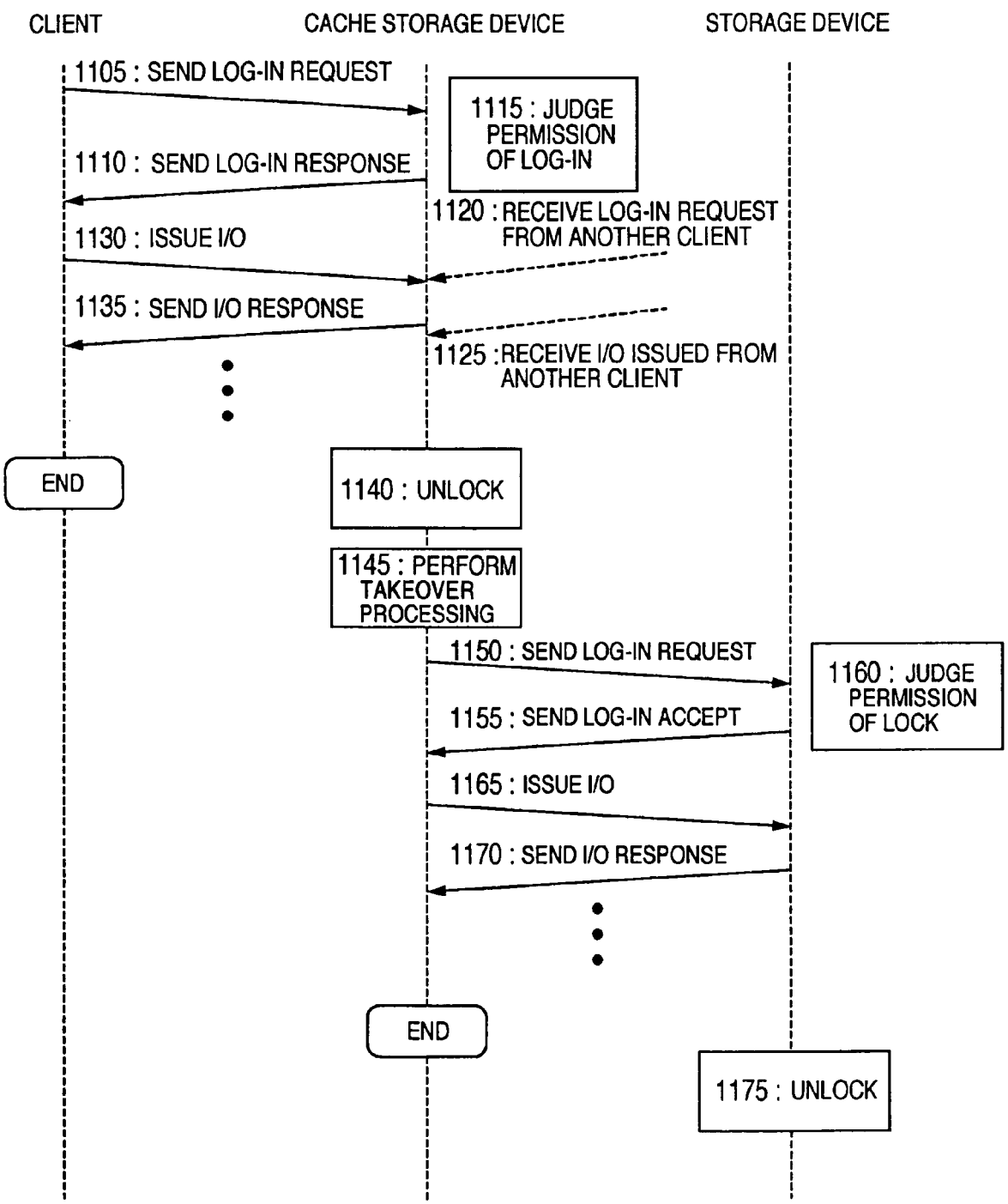
FIG. 10 is a chart showing an example of communication flow from a client to a storage device.

FIG. 10 is a chart showing a flow of communication among the client 105, the cache storage device 125 and the storage device 130. In FIG. 10, an area is locked when the client 105 logs in a device of the cache storage device 125.

Upon reception of a log-in request 1105 from the client 105, the cache storage device 125 checks the cache lock flag on the lock management table 225 included in the cache storage device 125.

The cache storage device 125 sends acceptance of the lock request to the client 105 when the cache lock flag is "OFF", and sends rejection as a reply to the lock request to the client 105 when the cache lock flag is "ON" (step 1110).

Upon reception of the acceptance of the lock request, the client 105 issues an I/O request to the cache storage device 125 (step 1130).

Upon reception of the I/O request, the cache storage device 125 processes the I/O request and sends a result status of processing to the client 105 (step 1135).

Even if a log-in request is received from another client 105 (step 1120) or even if an I/O request is received from another client 105 (step 1125), the cache storage device 125 rejects these requests during this period.

The steps 1130 and 1135 are repeated if necessary. When this series of steps is completed, the cache storage device 125 unlocks the area (step 1140).

Then, the cache storage device 125 takeover processing to a channel control processor 310 controlling an I/O path connected to the storage device 130 in order to send the data to the storage device 130. A channel control processor that communicates with the client, however, may keep on processing as it is. In this case, this process can be omitted (step 1145).

The procedure of communication between the cache storage device 125 and the storage device 130 after that is the same as the aforementioned procedure of communication between the client 105 and the cache storage device 125.

By the aforementioned lock control, batch processing can be made at the time of log-in authentication, so that the quantity of packet sent out to the network can be suppressed.

A modification of the aforementioned embodiment of the cache storage device will be described below.

Points not mentioned specially in the following description are the same as those in the aforementioned embodiment.

This modification is different from the aforementioned embodiment in that a proxy device 1060 is used in place of the network coupling device 140 for coupling the networks 1 and 2 to each other in FIG. 1.

The proxy device 1060 acts in place of the client 105 so that a request from the client 105 can be processed for the storage 130 and the cache storage device 125.

Specifically, the proxy device 1060 receives a request from the client 105 and starts communication with the cache storage device 125 in accordance with the request.

After completion of the communication, the proxy device 1060 receives status, etc. from the cache storage device 125 or the like and sends the status, etc. to the client 105.

According to this modification, the proxy device 1060 acts as an intermediary device by which the network 120 (network 1) to which the client 105 belongs and the network 135 (network 2) to which the storage device 130 belongs are linked to each other. Accordingly, the cache storage device 125 can improve response performance and transaction performance while illegal data can be prevented from flowing into the network 1.

Several examples of data correspondence among the storage device 130, the cache storage device 125 and the client 105 in the network system according to the aforementioned embodiment or modification will be described below.

Information concerning correspondence among the client, the cache storage device and the storage device is registered in the name service 110. The name service 110 is controlled by a management terminal or the like through the network 135 etc. so that the information can be set or changed.

Figure 14:
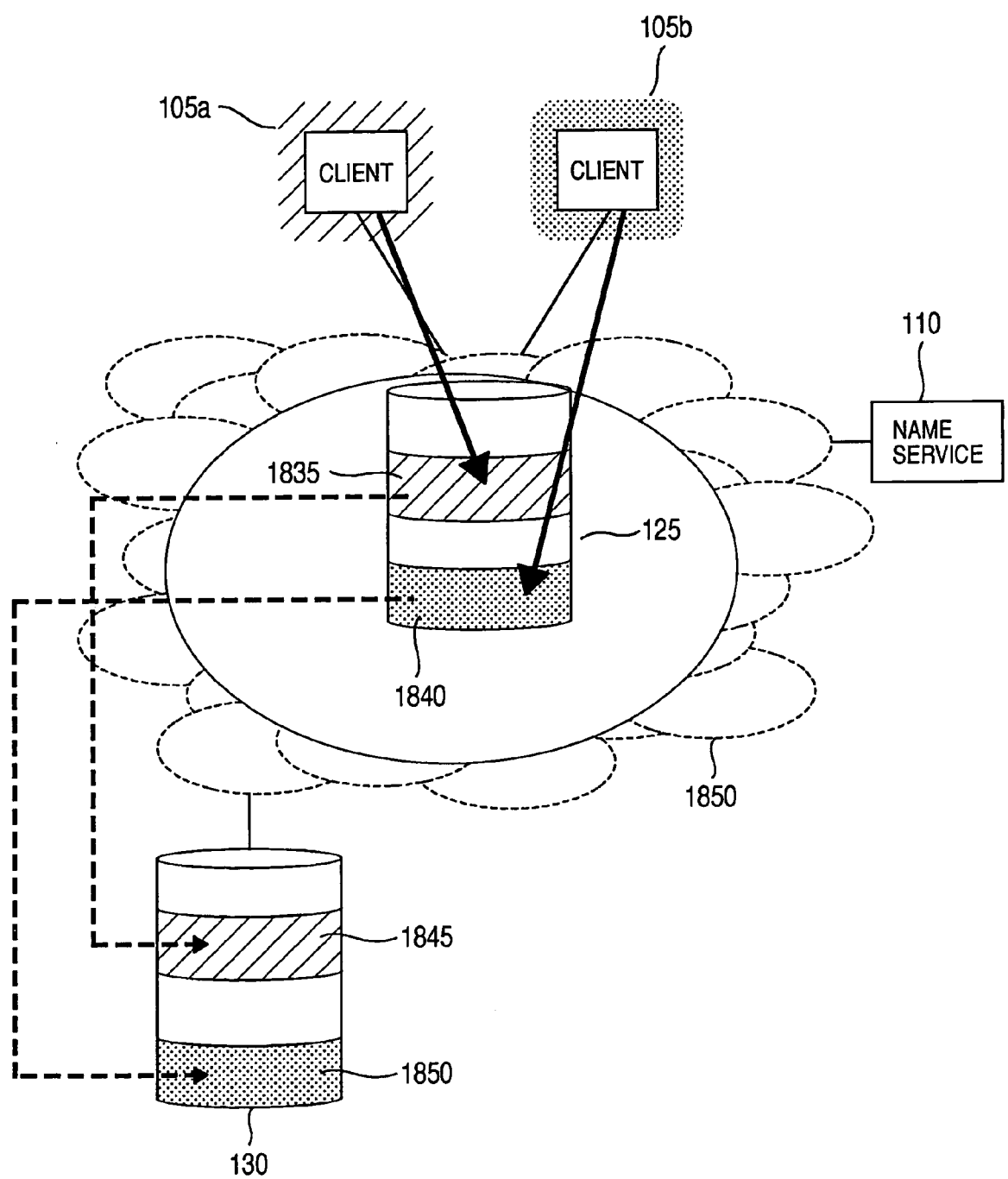
FIG. 14 is a schematic view showing an example of data correspondence among a client, a cache storage device and a storage device.

FIG. 14 is a diagram showing a first example of data correspondence.

Clients 105a and 105b communicate with the storage device 130. The client 105a uses a first storage area 1845 of the storage device 130 whereas the client 105b uses a second storage area 1850 of the storage device 130. Each of the first and second storage areas 1845 and 1850 may be constituted by all or part of a device or may be constituted by a plurality of devices. Incidentally, storage areas of the storage device 130 are areas exclusively used by corresponding clients respectively. That is, the client 105a does not make access to the second storage area whereas the client 105b does not make access to the first storage area.

Although this example shows the case where the storage device 130 has two storage areas corresponding to two clients 105, the number of clients and the number of storage areas in the storage device are not particularly limited.

Like the storage device 130, the cache storage device 125 has cache areas exclusively used by clients 105 respectively. A first cache area 1835 is allocated to the client 105a whereas a second cache area 1840 is allocated to the client 105b. Each of the first and second cache areas 1835 and 1840 may be constituted by all or part of a device or may be constituted by a plurality of devices. The cache areas are areas exclusively used by the clients 105 respectively. That is, data transmitted/received from/in the client 105a are not cached by the second cache area whereas data transmitted/received from/in the client 105b are not cached by the first cache area.

In this example, when a client 105 makes discovery about the storage device 130 (actually, the cache storage device 125) by using the name service 110, information of only one storage area allocated to the client 105 is sent back to the client 105.

More specifically, the name service 110 sends information concerning the first cache area to the client 105a (client 1) when the requester is the client 105a (client 1) whereas the name service 110 sends information concerning the second cache area to the client 105b (client 2) when the requester is the client 105b (client 2). In this manner, a plurality of clients 105 can surely make access to cache areas of the cache storage device 125 allocated to the clients 105 respectively.

Figure 15:
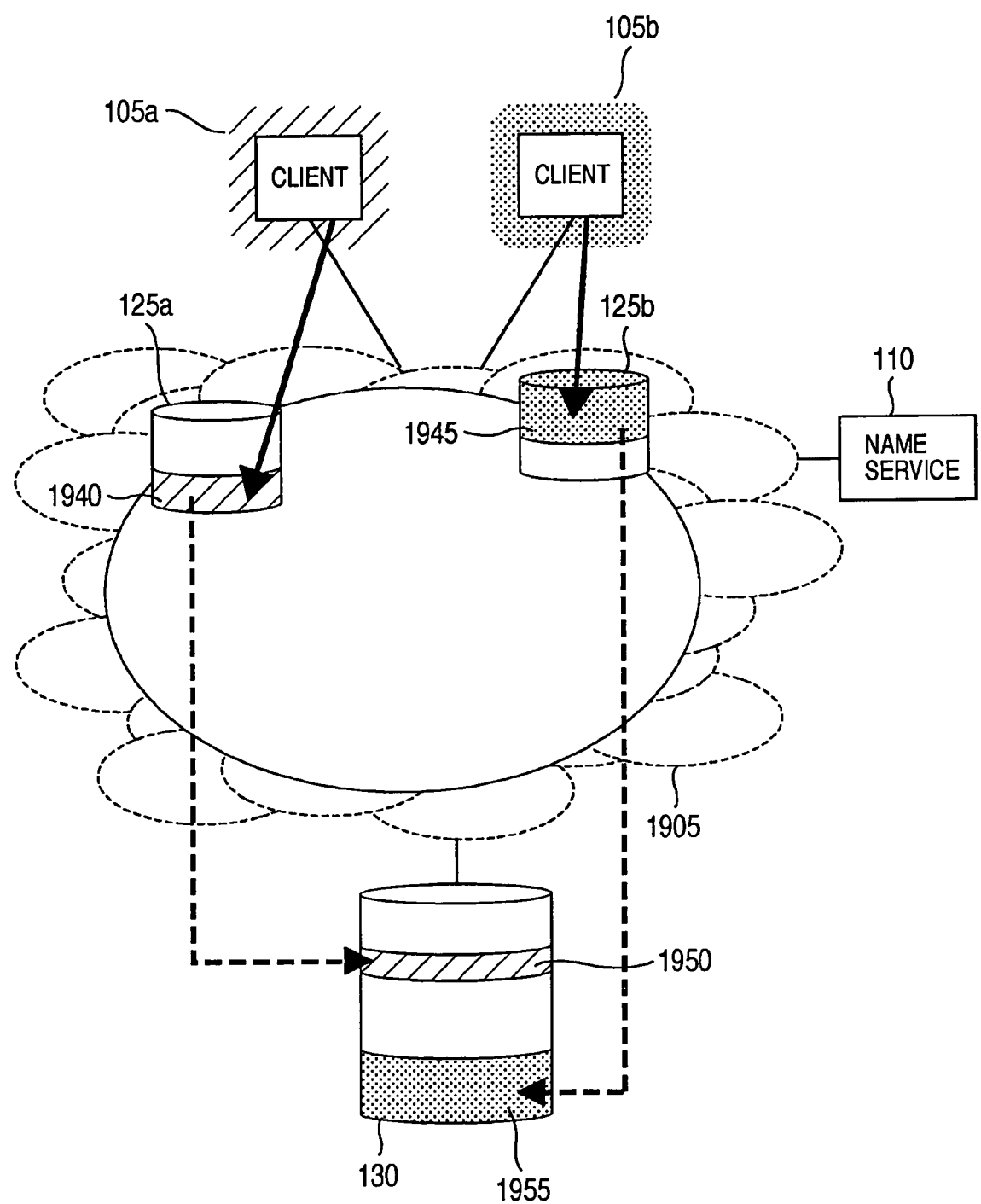
FIG. 15 is a schematic diagram showing an example of data correspondence among a client, a cache storage device and a storage device.

FIG. 15 is a diagram showing another example of data correspondence.

In this example, data stored in a single storage device 130 are cached while distributed into a plurality of cache storage devices 125.

That is, a cache area 1940 for a client 105a is present in a cache storage device 125a whereas a cache area 1945 for a client 105b is present in a cache storage device 125b.

The cache storage devices 125a and 125b have information concerning a storage area 1950 of the storage device 130 and information concerning a storage area 1955 of the storage device 130, respectively.

In this example, upon reception of a request for information of the storage device 130 from the client 105a, the name service 110 sends information of the cache area 1940 of the cache storage device 125a back to the client 105a.

Upon reception of the request for information of the storage device 130 from the client 105b, the name service 110 sends information of the cache area 1945 of the cache storage device 125b back to the client 105b.

According to this example, cache data can be stored in a storage device safely under such an environment that data for at least one client 105 are managed distributively.

Figure 16:
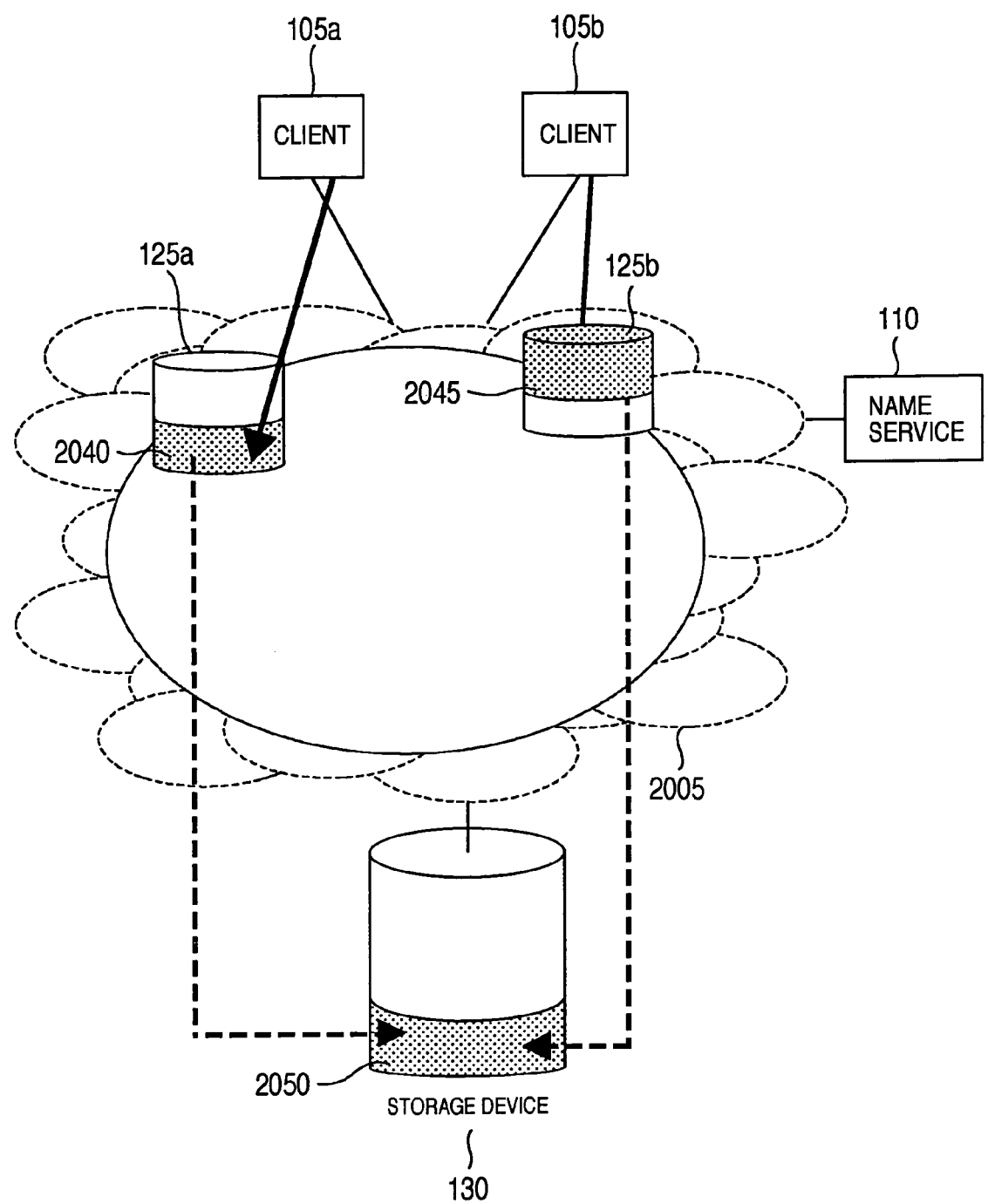
FIG. 16 is a schematic diagram showing an example of data correspondence among a client, a cache storage device and a storage device.

FIG. 16 is a diagram showing a further example of data correspondence.

In this example, a plurality of clients 105 make access to one storage area in a storage device 130 but data for the clients 105 are cached so as to be distributed into a plurality of cache storage devices 125.

Upon reception of a request for information of the storage device 130 from a client 105a, the name service 110 sends information of a cache area 2040 of a cache storage device 125a back to the client 105a. Upon reception of a request for information of the storage device 130 from a client 105b, the name service 110 sends information of a cache area 2045 of a cache storage device 125b back to the client 105b.

Incidentally, in this example, there is a possibility that access conflict may occur because two clients 105 use one storage area of the storage device 130 in common.

In order to avoid such access conflict, in this example, each client 105 locks the storage device 130 through a corresponding cache device 125 in the same manner as in the aforementioned embodiment.

Another modification of the embodiment of the cache storage device will be described below more in detail with reference to the drawings.

Points not mentioned specially in the following description are the same as those in the aforementioned embodiment.

This modification is different from the aforementioned embodiment in that a name service independently present in the aforementioned embodiment is incorporated in a cache storage device 125.

Figure 17:
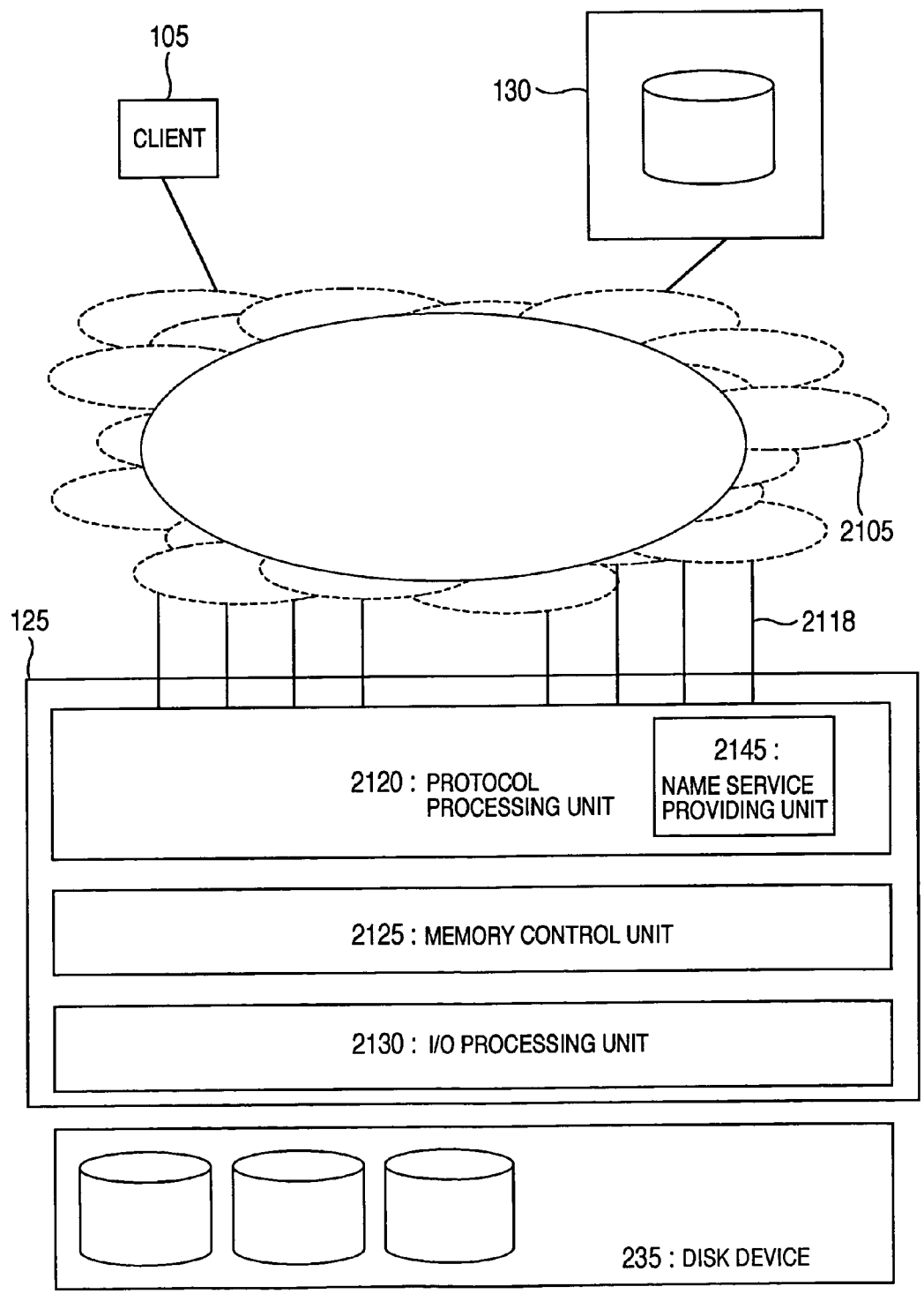
FIG. 17 is a diagram showing an example of configuration of a storage device.

FIG. 17 is a diagram showing an example of a network system including a cache storage device 125 according to this modification. In the network system, a client 105, a cache storage device 125 and a storage device 130 are connected to one another through a network 2105.

In the cache storage device 125 shown in FIG. 17, the plurality of channel control units 210 shown in FIG. 2 are generically called "protocol processing unit 2120", the cache memory control unit 215 and the shared memory control unit 220 shown in FIG. 2 are generically called "memory control unit 2125", and the plurality of disk control units 230 shown in FIG. 2 are generically called "I/O processing unit 2130". The protocol processing unit 2120 of the cache storage device 125 further has a name service providing unit 2145.

The storage device 130 shown in FIG. 17 has the same configuration as that of the cache storage device 125 shown in FIG. 17 except that the name service providing unit 2145 is not provided in the storage device 130.

The protocol processing unit 2120 and the memory control unit 2125 are connected to each other. The memory control unit 2125, the I/O processing unit 2130 and the disk device 235 are connected to one another.

The protocol processing unit 2120 has at least one communication port. A network identifier is allocated to each communication port.

The network identifier is information such as an IP address, an MAC address or a port number for identifying each communication port.

The name service providing unit 2145 manages the network identifiers, iSCSI names allocated to disk drives of the disk device 235 of the cache storage device 125, network identifiers and iSCSI names for the storage device 130 and information for other devices on the network 2105 and holds information for reporting pertinent information in response to inquiries from devices such as clients.

Although this modification shows the case where the protocol processing unit 2120, the memory control unit 2125, the I/O processing unit 2130, the name service providing unit 2145 and the disk device 235 are mounted in a chassis, the same function as described above can be also achieved in the case where they are mounted in chassis separately.

In this modification, a discovery request from a client 105 as described above in the aforementioned embodiment is sent to the cache storage device 125. Upon reception of the request, the cache storage device 125 sends its own information to the client 105 in place of the information of the storage device 130 to be accessed by the client 105. The steps after that are the same as in the aforementioned embodiment.

Incidentally, when a plurality of cache storage devices 125 are provided in a network, name service processing may be allocated to any one of the cache storage devices 125 or all the cache storage devices 125. When name service processing is allocated to all the cache storage devices 125, a cache storage device 125 having a name service providing unit 2145 and allowed to receive a discovery request from each of clients 105 may be decided in advance as specific one of the cache storage devices 125.

According to this modification, because such a name service providing unit is mounted in each storage device, it is unnecessary to inquire of an external name service and it is possible to improve the secrecy of information managed by the name service.

According to the invention, it is possible to make data communication improved in both response performance and transaction performance due to block-by-block data caching between a server and a storage device and guaranteed in terms of consistency, freshness and security of data between the storage device and a client.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A cache storage system connected to a plurality of clients and at least one storage device through a network, comprising:
  a controller including a lock management table containing lock status, whether a lock is required or not, and an address correspondence table for indicating correspondence of areas in said cache storage system with areas in said at least one storage device,
  wherein said lock management table at least contains indices for identifying areas of said device in said cache storage system, flags for indicating said lock status of areas of said device in said cache storage system, and flags for indicating said lock status of areas in said at least one storage device corresponding to said areas of said device in said cache storage system; and
  a device storing data;
  wherein requests for accessing to write data from said clients may compete with each other, and wherein said controller controls said device to temporarily store block data which are exchanged between a client and said at least one storage device through said network and which designate a logical address on a storage medium and a data length;
  wherein said controller, upon receiving from said client a first lock request for an area of said at least one storage device,
  issues a second lock request to said at least one storage device to lock an area of said at least one storage device, and after receiving either status information of good or status information of reservation conflict from said at least one storage device, issues a second command of lock OK to said client in order to receive a first command of lock Acknowledge from said client, and upon receiving said first command of lock Acknowledge from said client, sends a second command of lock Acknowledge to said at least one storage device to update the contents of said lock management table of said at least one storage device to indicate lock ON for said area of said at least one storage device so that deadlock can be avoided when a first lock request is received from another client on the basis of contents of a lock management table of said at least one storage device;
  wherein said controller, after receiving a first I/O request from said client, issues a first I/O response to said client and issues a second I/O request for sending data received from said client to said at least one storage device until said controller receives a first unlock request from said client;
  wherein said controller, upon receiving said first unlock request from said client, issues a second unlock request to said at least one storage device to unlock the area of said at least one storage device; and
  wherein said controller, upon reception of a second command of unlock OK from said at least one storage device, sends a second command of unlock Acknowledge to said at least one storage device to unlock said area of said at least one storage device.

2. A cache storage system according to claim 1, wherein said controller issues, upon reception of no response to said second I/O request issued to said at least one storage device therefrom, said second I/O request to said at least one storage device corresponding to said area of said device in said cache storage system to write contents of said area of said device in said cache storage system.

3. A cache storage system according to claim 2, wherein said controller encrypts data when said controller sends said data to said at least one storage device.

4. A cache storage system according to claim 1, wherein upon reception of a first read request from said client, said controller sends data to said client when said data is present on said cache storage system, and requests said at least one storage device to send data and sends said data given from said at least one storage device to said client when said data is absent on said cache storage system.

* * * * *